United States Patent [19]

Kunda et al.

[11] 3,985,553

[45] Oct. 12, 1976

[54] PROCESS FOR THE RECOVERY OF COPPER AND AMMONIUM SULPHATE FROM COPPER-BEARING MINERAL SULPHIDE ORES OR CONCENTRATES

[75] Inventors: Wasyl Kunda, Fort Saskatchewan; Boris Rudyk; Michael Kohut, both of Edmonton, all of Canada

[73] Assignee: Sherritt Gordon Mines Limited, Toronto, Canada

[22] Filed: Apr. 29, 1975

[21] Appl. No.: 572,817

[30] Foreign Application Priority Data

Oct. 17, 1974 Canada .................................. 211606

[52] U.S. Cl. ................................ 75/103; 75/101 R; 75/108; 75/117
[51] Int. Cl.² ........................................ C22B 15/10
[58] Field of Search ................. 75/103, 101 R, 117, 75/108, .5 A

[56] References Cited

UNITED STATES PATENTS

| | | | |
|---|---|---|---|
| 2,727,819 | 12/1955 | Kenny et al. ...................... | 75/117 X |
| 2,822,263 | 2/1958 | Forward .............................. | 75/117 |
| 3,817,743 | 6/1974 | Sardisco ............................ | 75/117 X |
| 3,860,689 | 1/1975 | Setton et al. ...................... | 75/103 X |

*Primary Examiner*—G. Ozaki
*Attorney, Agent, or Firm*—James T. Wilbur; Arne I. Fors; Frank I. Piper

[57] ABSTRACT

The process involves subjecting finely divided particles of copper-bearing mineral sulphide ores or concentrates to a first stage leach in which the particles are leached in an aqueous ammoniacal ammonium carbonate solution in the presence of free oxygen to provide a first stage leach slurry which contains dissolved copper values. Residue is separated from the first stage leach slurry and is subjected to attrition in order to rub off an outer layer therefrom and expose surfaces of the residue beneath the layer. The resulting residue is passed to a second stage leach which is carried out in the same way as the first leach. Solution is removed from the second leach stage and is recycled to the first leach stage. The first stage leach solution is further treated for recovery of copper and ammonium sulphate.

13 Claims, 1 Drawing Figure

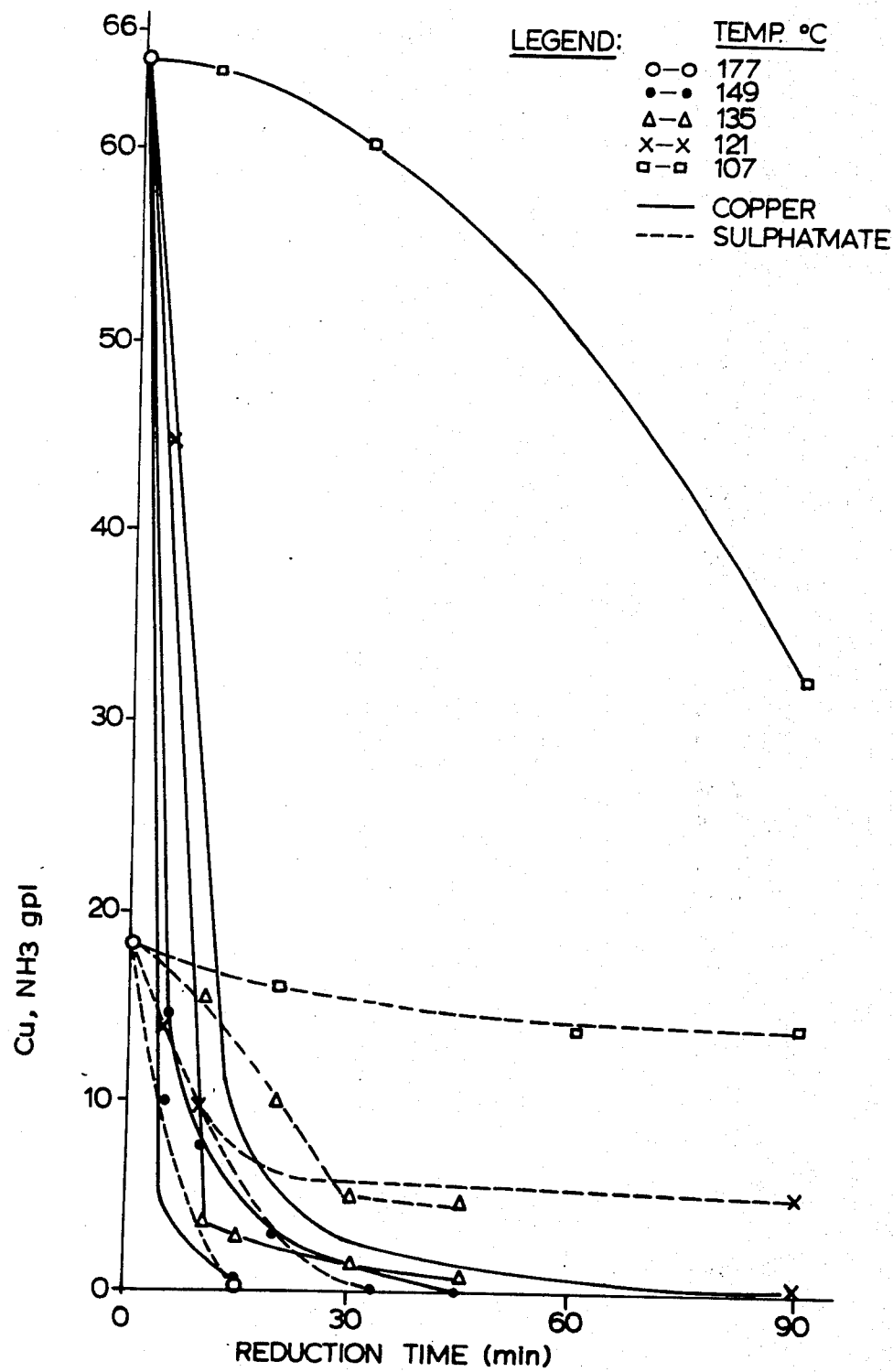

PROCESS FOR THE RECOVERY OF COPPER AND AMMONIUM SULPHATE FROM COPPER-BEARING MINERAL SULPHIDE ORES OR CONCENTRATES

This invention relates to the hydrometallurgical treatment of complex copper-bearing mineral sulphide ores and concentrates and is more particularly directed to a process for the extraction of copper values and optionally for the production of ammonium sulphate from such ores and concentrates by direct oxidizing pressure leaching in an ammoniacal medium.

Copper is often present in ores and concentrates in the form of complex mineral sulphides containing copper, iron and sulphur combined in varying proportions. Copper is, for example, in such form in chalcopyrite ($CuFeS_2$), bornite ($Cu_3FeS_3$), covellite ($CuS$) and chalcocite ($Cu_2S$). One hydrometallurgical approach used to extract copper and other non-ferrous metal values from such ores and concentrates involves leaching them under oxidizing conditions at elevated temperatures, below the melting point of sulphur, in an aqueous acid solution containing at least one mole of acid per mole of metal to be leached. Copper and other soluble sulphate-forming, non-ferrous metals are dissolved in the leach solution and sulphide sulphur in the ore is oxidized to elemental form. The dissolved metals may be recovered from the leach solution and the elemental sulphur from the residue by methods known in the art. A particularly desirable feature of this process is that sulphur is recovered in elemental form and can be economically stored or shipped in such form.

The known low temperature acid-oxidation leaching processes for complex copper-iron sulphides suffer from several disadvantages which adversely affect their capital and operating economics. Such processes generally require prolonged leaching periods to produce acceptable copper extractions. For example, to extract about 85% of the copper from a typical chalcopyrite concentrate by leaching in a sulphuric acid solution at about 118° C. and under about 50 p.s.i. oxygen pressure, about 12 hours is required. Such extended retention times naturally reflect unfavourably on the overall economics of these processes. Furthermore, the leach solution is highly corrosive and high cost vessels are required to contain it. Another disadvantage of these processes, particularly when applied to chalcopyrite, is that regardless of leaching conditions or retention times, total copper recovery is generally less than 85%. There is, therefore, substantial room for improvement in the degree of extraction as well as the rate of extraction in these processes.

Another problem is the removal of iron contamination from the leach solution. It is necessary, in order to facilitate subsequent processing of the leach solution for the recovery of copper, that the solution contain a maximum amount, preferably less than g.p.l., of dissolved iron. However, during leaching, a substantial quantity of the iron present in the sulphides reacts with available acid and goes into solution as iron sulphate. This iron can be effectively removed from solution by hydrolysis but the ferrous sulphate must first be oxidized to the 3-valent form. Thus two additional steps are required: an oxidation step and a hydrolysis step, in order to decrease the concentration of iron to a value at which it will not hinder subsequent steps for the recovery of copper.

The principal object of the present invention is to provide a process for the direct oxidation leaching of complex copper-bearing mineral sulphide ores and concentrates whereby a very high proportion of copper values are extracted and dissolved in solution where they may be readily recovered therefrom.

Another object of the invention is to provide a leaching process wherein a very high proportion of copper in complex copper-bearing mineral sulphide ores and concentrates is converted to a soluble form while any iron contained in said ores and concentrates converts to an insoluble form which may be readily separated from the copper-containing solution by conventional liquid-solid separation methods.

A further object of the invention is to provide a method by which copper may be precipitated and recovered from the last-mentioned solution by gas reduction and the bulk of the sulphur content of the solution may be recovered in the form of ammonium sulphate.

These and other objects may be accomplished by a process which involves subjecting finely divided particles of a copper-bearing mineral sulphide ore or concentrate to a first stage leach in which said particles are leached in an aqueous ammoniacal ammonium carbonate solution in the presence of free oxygen to provide a first stage leach slurry which contains dissolved copper values; separating residue from the first stage leach slurry; subjecting said separated residue to attrition in order to rub off an outer layer therefrom and to expose surfaces beneath said layer; passing said residue from the preceding step to a second stage leach and leaching same in an aqueous ammoniacal ammonium carbonate solution in the presence of free oxygen to provide a second stage leach slurry; separating solution from said second stage leach slurry and recycling same to said first leach stage; and removing solution from said first stage leach slurry for subsequent treatment for recovery of copper values therefrom.

The process of this invention is applicable to both high and low grade copper-bearing mineral sulphide ores and concentrates. The starting material may, for example, be a high grade copper- and iron-containing sulphide concentrate obtained by selective froth flotation of copper-bearing sulphide ores. Such a concentrate may contain a number of non-ferrous metals in addition to copper. For example, a typical chalcopyrite concentrate may include such metals as zinc, nickel, cobalt and cadmium. It is to be understood that the use of the terms "complex sulphides" or "sulphides" herein is intended to include such material and it is also intended to include any other high or low grade materials which contain economically recoverable quantities of copper in complex sulphide form.

In carrying out the present invention, the first step involves comminution of the sulphide starting material, such as by wet grinding, preferably to at least 100% minus 100 mesh standard Tyler screen and more preferably to 70% minus 325 mesh. After comminution, the sulphides are passed to a first stage leaching step in which they are dispersed in an ammoniacal ammonium carbonate solution to form a slurry which contains from about 20% to about 40% solids. The leach solution preferably contains about 8 moles per liter free ammonia and at least 1 mole of ammonium carbonate per mole of copper and any other carbonate-forming metals in the material subjected to leaching. Preferably the solution is provided with a sufficient excess of ammonium carbonate over this amount to ensure maximum extraction and dissolution of desired copper values. Copper extraction increases with increasing ammonium carbonate concentration and for this reason it is preferable to maintain the ammonium carbonate concentration in the range of about 100 to 120 grams per liter.

The leaching reaction usually in conducted at a temperature from about 16° C. to 115° C. preferably at 105° C in the presence of free oxygen which is provided, for example, by sparging a free oxygen-containing gas such as air into the leaching vessel. The oxygen-containing gas may be under atmospheric pressure but preferably, to ensure a rapid leaching rate, the gas is under pressure of about 10 to 40 p.s.i. and more preferably under a pressure of about 20 p.s.i. Leaching is preferably continued to obtain optimum dissolution of copper and usually about one hour is sufficient for the purpose.

It is believed that the principal reaction which takes place during leaching is as follows:

$$CuFeS_2 + (NH4)_2CO_3 + 6NH_3 + 4.25O_2 + H_2O \rightarrow Cu(NH_3)_4CO_3 + 2(NH_4)_2SO_4 + 0.5Fe_2O_3$$

The complex copper carbonate readily dissolves in solution while the oxidic form which the iron takes is insoluble.

Following leaching, solution is separated from undissolved residue by conventional liquid-solid separation means such as by thickening. The residue (which when separated by thickening will form the underflow from the thickener and which usually contains from 40% to 60% moisture) is passed to an attrition step. The purpose of this step is to rub or scuff off the outer layer from the ore particles and to expose the surfaces beneath this layer.

It is believed that the outer layer of the particles is made up of ferric oxide ($Fe_2O_3$) probably in a hydrated form ($Fe(OH)_3$) to which, as previously indicated, the iron values in the ore being treated convert when they are exposed to the leach solution. If the ferric oxide-containing layer remains intact during leaching the layer acts as a diffusion barrier and prevents the penetration of the leach solution and oxygen into the particles and the diffusion of copper values out of them. As a result, the particles are incompletely leached and a substantial proportion of their copper values remains out of contact with the leach solution.

Attrition it is believed serves to rub or scuff off the ferric oxide-containing layer from the particles and to expose the surfaces of the particles beneath the coating to attack by the oxygen-containing leach solution. The latter solution may penetrate these surfaces and substantially more copper is extracted than is the case where the particles are not subjected to attrition.

Attrition can be carried out in a ball mill, a rod mill, a tube mill or a vessel in which sustained agitation of the particles takes place. During the attrition, the particles can be exposed to an oxygen-containing gas which will, where they are still wetted by the leach solution, result in some further leaching of the particles thereby shortening the time required in the subsequent second stage leaching step to obtain optimum extraction of copper values.

Whatever device is employed for attrition, steps should be taken to ensure that the device causes ore particles to remain in rubbing contact with each other or with grinding balls or rods. By so doing, the iron-containing outer layer will be continuously abraded from the particles. The device need not be operated in such a way that it grinds or breaks the particles into a highly comminuted form.

Following attrition the slurry is passed to a second stage leaching step in which the particles in the slurry are leached in fresh ammoniacal ammonium carbonate solution under the same conditions as the first stage leaching step. Second stage leach solution is separated from residue, preferably by thickening and filtering and the solution is recycled to the first stage leaching operation while the second stage residue is washed to separate any remaining leach solution associated therewith. The wash solution is passed to the leaching operation while the washed residue is discharged to waste or is passed to a subsequent treatment for recovery of undissolved metal values such as iron and precious metals.

Solution from the first leaching stage, which contains both solution recycled from the second leaching stage as well as solution generated in the first stage of leaching is then treated for recovery of copper values. Copper can be precipitated from the solution by known methods such as by cementation or by electrolysis. Alternatively and preferably copper is precipitated by means of a reducing gas. To prepare the solution for gas reduction it should be heated at or near its boiling temperature, to decrease its free ammonia and carbon dioxide content. Heating is desirably continued until the molar ratio of free ammonia to copper in solution is about 3:1. The released ammonia and carbon dioxide react to from ammonium carbonate which can be recovered for re-use in the leaching stage.

Following heating, the solution is acidified with sulphuric acid until the free ammonia to copper ratio is less than about 2:1 and the pH is in the range of about 1–3, preferably about 3. The acidified solution is then ready for treatment by gas reduction.

Gas reduction involves treating the acidified solution with a reducing gas such as, for example, carbon monoxide, sulphur dioxide or hydrogen at a temperature and pressure above standard conditions. It is preferred to use hydrogen as the reducing gas and to treat the acidified solution with such gas at a temperature above about 105° C. and preferably about 120° C. The solution may be treated in a reaction vessel adapted to withstand relatively high pressures, such as an autoclave. The solution is preferably actively agitated and hydrogen is fed to the vessel in amount sufficient to maintain a partial pressure of hydrogen (above the pressure autogenously generated at the temperature at which the reducing reaction is conducted) of above about 100 p.s.i. and preferably in the range of about 300 to about 500 p.s.i. Under these conditions, copper values dissolved in solution rapidly reduce to and precipitate from solution as a fine metal powder substantially free from impurities.

It may not be economic to continue the reduction stage beyond the time required to decrease the concentration of copper in solution below about one gram per liter. To precipitate the remaining copper values, the solution may be treated with a sulphidizing agent such as hydrogen sulphide. Upon contact with the agent, copper values will convert to copper sulphide and may be removed from solution and returned to the leaching stage.

Copper metal powder recovered from the reduction stage can be marketed as such or it can be compacted or melted and cast into commercial shapes such as wire bars and ingots.

The reduction end solution, after separation of dissolved copper values, consists essentially of aqueous ammonium sulphate which can be recovered from this solution by known means, such as by crystallization and can be marketed as such or can be passed to a regenerator for the recovery of ammonia.

It is a feature of the gas reduction procedure described above that it can be carried out under relatively mild conditions to yield a reduction end solution from which ammonium sulphate can be recovered in a form which is virtually completely free of sulphamate contamination. While ammonium sulphamate is produced during the leaching of copper-bearing mineral sulphides, it is found that the sulphamate is hydrolyzed to sulphate during the gas reduction operation provided the temperature of the acidified solution during gas reduction is above about 150° C. That the sulphamate values should be hydrolyzed when the operation is conducted as indicated is surprising since it is generally believed that a temperature in excess of about 230° C. is necessary for sulphamate hydrolysis.

It has been found that pH has an important influence on the hydrolysis of sulphamate values and that provided the solution subjected to gas reduction has a pH below about 7 and preferably about 3, virtually all sulphamate values will hydrolyze to sulphate. Thus no special heating step need be incorporated into the subject process to remove sulphamate from the reduction end solution.

Sulphamate values cannot of course be tolerated in any ammonium sulphate used as fertilizer since they are detrimental to vegetation.

EXAMPLE 1

This example illustrates the steps of the subject process as they are carried out on finely divided chalcopyrite ore of the following size: 100% minus 100 mesh; 75% minus 325 mesh. The ore contained (by weight) 26.7% Cu, 36.7% S, 32.4% Fe and 1.06% Zn. A 2000 gram sample of ore was dispersed in 5 liters of an ammoniacal ammonium carbonate solution containing 2 moles per liter ammonium carbonate and 8 moles per liter ammonia. The resulting so-called "first stage" slurry was charged into an autoclave and was maintained at a temperature of 105° C. for 1 hour under an over-pressure of oxygen of 20 p.s.i.g. The charge was then removed from the autoclave and the solution and residue were both analyzed.

The residue was then subjected to attrition in a ball mill for 30 minutes after which it was combined with sufficient fresh ammoniacal ammonium carbonate solution to make up 4 liters of a "second stage" slurry. The latter slurry contained 2 moles per liter ammonium carbonate and 8 moles per liter ammonia and was leached under the same conditions as above after which the resulting solution and residue were separated from one another by filtration and were analyzed. The solution was recycled to the first stage slurry.

Two liters of solution removed from the first stage slurry were heated to the boiling point in a boiling flask. Nitrogen gas was sparged into the boiling solution at the rate of 1 liter per minute to cause water vapour and gaseous ammonia and carbon dioxide to discharge from the flask. When the $NH_3/Cu$ molar ratio of the liquid in the flask decreased to 3.55, boiling was discontinued and the liquid was brought to original volume by the addition of water. The liquid was then analyzed.

Sulphuric acid was added to the liquid to lower its $NH_3$(free)/Cu molar ratio to less than 2.0. The resulting solution, analyzing (gpl) Cu 78, S 119.0, $CO_2$ 3.0 and $NH_3$(free) 42 was charged into an autoclave where it was maintained at a temperature of 150° C. for about 30 minutes. The solution was contacted with hydrogen under an over-pressure of 500 p.s.i. for about 30 minutes to cause reduction and precipitation of the copper values. The resulting precipitate was analyzed. The reduction end solution contained 0.1 gpl copper.

The results of the analyses described above are set out in the following table:

|  | First Stage Leach | | Second Stage Leach | |
| --- | --- | --- | --- | --- |
|  | Solution (gpl) | Residue (wt. %) | Solution (gpl) | Residue (wt. %) |
| Cu | 76.0 | 8.7 | 24.5 | 0.69 |
| S | 76.2 | 23.3 | 34.0 | 13.8 |
| Fe | 0.018 | 46.0 | 0.015 | 55.2 |
| Zn | 1.62 | 0.90 | 1.41 | 0.59 |
| $CO_2$ | 78 | 0.4 |  | 1.5 |
| $NH_3$ | 171 | 0.5 |  | 0.9 |
| $S(SO_4)$ |  | 0.6 |  | 0.3 |
| C |  |  |  |  |

|  | Boiling and Reduction | |
| --- | --- | --- |
|  | Solution after boiling (gpl) | Precipitate following reduction (wt. %) |
| Cu | 82 | 99.6 |
| S |  | 0.005 |
| Fe |  | 0.005 |
| Zn |  |  |
| $CO_2$ | 4 | 0.057 |
| $NH_3$ | 78 |  |
| $S(SO_4)$ |  |  |
| C |  | 0.014 |

The overall extraction from the two stages of leaching was as follows: Cu 98.6%, S 78.9%, Fe 0%, and Zn 70.6%. Thus substantially all copper values were extracted by the leaching and attrition step whereas virtually all iron values remained in the leach residue. The final copper product is of sufficient purity to meet market requirements for commercial grades of copper.

EXAMPLE 2

This example illustrates the effect of temperature of the copper-containing solution subjected to gas reduction on the rate of copper precipitation and sulphamate hydrolysis. The starting solution was a copper-zinc solution having a $NH_3$(free)/Cu + Zn molar ratio of 3.34:1. The solution was derived from the leaching in ammoniacal ammonium carbonate solution of a chalcopyrite ore having a high zinc content.

The starting solution was boiled to drive off free ammonia and carbon dioxide; then was acidified by the addition of 220 g. sulphuric acid per liter of solution. The acidified solution was charged into an autoclave. The charge was heated in the presence of hydrogen under a partial pressure of 350 p.s.i. to various temperatures. The results are shown in the Figure.

The Figure shows that the reduction of copper was complete within 15 to 30 minutes at all temperatures between 121° C. and 177° C. At 107° C. the reduction proceeded much more slowly but still at a reasonable rate.

Rapid and complete hydrolysis of sulphamate required a temperature of at least 149° C. At lower temperatures the rate decreased and at 107° C. hydrolysis ceased completely.

What we claim as new and desire to protect by Letters Patent of the United States is:

1. A process for treating chalcopyrite ore or concentrate to extract copper values therefrom comprising: subjecting finely divided particles of said chalcopyrite to a first stage leach in which said chalcopyrite particles are leached in an aqueous ammoniacal ammonium carbonate solution in the presence of free oxygen to provide a first stage leach slurry which contains dissolved copper values; separating residue from the first stage leach slurry; subjecting said separated residue to controlled attrition in order to rub off only an outer layer therefrom and to expose surfaces beneath said layer; passing said residue from the preceding step to a second stage leach and leaching same in an aqueous ammoniacal ammonium carbonate solution in the presence of free oxygen to provide a second stage leach slurry; separating solution from said second stage leach slurry and recycling same to said first leach stage; and removing solution from said first stage leach slurry for subsequent treatment for recovery of copper values therefrom.

2. The process as claimed in claim 1 wherein said solution removed from said first stage leach slurry is treated for recovery of copper values therefrom by heating same to drive off contained ammonia and carbon dioxide; adding sulphuric acid to said heated solution to decrease the ammonia to copper ratio to less than about 2:1 and to decrease the pH to below about 7; reacting said sulphuric acid-containing solution with a reducing gas at elevated pressure and at a temperature above about 105° C. to cause dissolved copper values to reduce to and precipitate from solution; and recovering said precipitated copper values.

3. The process as claimed in claim 2 wherein said sulphuric acid-containing solution is reacted with said reducing gas at a temperature above about 150° C.

4. The process as claimed in claim 3 wherein the pH of said sulphuric acid-containing solution is about 3.

5. The process as claimed in claim 2 wherein said reducing gas is hydrogen and said sulphuric acid-containing solution is reacted therewith at a temperature above about 120° C. and under a partial pressure thereof of above about 100 p.s.i..

6. The process as claimed in claim 2 wherein said reducing gas is hydrogen and said sulphuric acid-containing solution is reacted therewith at a temperature above about 120° C. and under a partial pressure thereof of between about 300 and about 500 p.s.i.

7. The process as claimed in claim 2 wherein said sulphuric acid-containing solution, after reaction with said reducing gas and recovery of precipitated copper values is treated for recovery of ammonium sulphate.

8. The process as claimed in claim 1 wherein said first and second stage leach solutions contain about 8 moles per liter free ammonia and at least 1 mole of ammonium carbonate per mole of copper and any other carbonateforming metals in said first and second stage leach slurries respectively.

9. The process as claimed in claim 1 wherein said first and second stage leach solutions contain about 100 to 120 grams per liter ammonium carbonate.

10. The process as claimed in claim 1 wherein said first and second stage leach slurries are maintained at a temperature of about 16° to about 115° C.

11. The process as claimed in claim 1 wherein said first and second stage leach slurries are maintained at a temperature of about 105° C.

12. The process as claimed in claim 1 wherein the oxygen in the presence of which said first and second stage leaches are conducted is under a pressure of about 10 to about 40 p.s.i.

13. The process as claimed in claim 1 wherein the oxygen in the presence of which said first and second stage leaches are conducted is under a pressure of about 20 p.s.i.

* * * * *